United States Patent
Benisty et al.

(10) Patent No.: US 12,277,061 B2
(45) Date of Patent: Apr. 15, 2025

(54) ATS PRI SUPPORT WITH IMPLICIT CACHE

(71) Applicant: Western Digital Technologies, Inc., San Jose, CA (US)

(72) Inventors: Shay Benisty, Beer Sheva (IL); Amir Segev, Meiter (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/359,683

(22) Filed: Jul. 26, 2023

(65) Prior Publication Data

US 2024/0143508 A1    May 2, 2024

Related U.S. Application Data

(60) Provisional application No. 63/421,254, filed on Nov. 1, 2022.

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
CPC ........................ G06F 12/0862; G06F 2212/602
See application file for complete search history.

(56) References Cited

U.S. PATENT DOCUMENTS

| | | | | |
|---|---|---|---|---|
| 2018/0074757 A1* | 3/2018 | Yamaguchi | ........... | G06F 3/0659 |
| 2019/0227943 A1* | 7/2019 | Chen | ................... | G06F 12/0676 |
| 2021/0406199 A1* | 12/2021 | Kounavis | .............. | G06F 12/063 |
| 2023/0176978 A1* | 6/2023 | Chin | ................... | G06F 12/1009 711/202 |
| 2023/0333990 A1* | 10/2023 | Helmick | ............. | G06F 12/1045 |
| 2023/0359392 A1* | 11/2023 | Singh | .................... | G06F 3/0659 |
| 2023/0376422 A1* | 11/2023 | Watanabe | ............... | G06F 12/10 |
| 2024/0143515 A1* | 5/2024 | Chakrabarty | ........... | G06F 13/30 |

* cited by examiner

*Primary Examiner* — Ryan Bertram
(74) *Attorney, Agent, or Firm* — PATTERSON + SHERIDAN, LLP

(57) ABSTRACT

The present disclosure generally relates to improved address translation. Rather than fetching translated addresses using ATS/ATC, a HIM address translation search engine (HATS) is used through implementing the ATC in a layer above per an NVMe command. The HATS is an engine that will monitor pointers with untranslated addresses and will fetch the translated addresses for the pointers. Once the translated addresses are fetched for the pointer, the HATS will overwrite the untranslated address with the translated address. The HATS will then update the status of the pointers. When a translation request fails, the device will use PRI to request the translated address. During a translation request fail the device will drain any incoming requests while skipping the data transfer phase. The device will not block any other requests in a queue. Once that translated address is received through the PRI flow, the status of the pointer will be updated. After PRI completes, the device will return to using the HATS to get all the translated addresses for the pointers with an untranslated address status. After getting the translated addresses, the device shall use the translated addresses to perform DMA operations.

20 Claims, 7 Drawing Sheets

ATS PRI SUPPORT WITH IMPLICIT CACHE

CROSS-REFERENCE TO RELATED APPLICATIONS

This application claims benefit of U.S. Provisional Patent Application Ser. No. 63/421,254, filed Nov. 1, 2022, which is herein incorporated by reference.

BACKGROUND OF THE DISCLOSURE

Field of the Disclosure

Embodiments of the present disclosure generally relate to improved address translation.

Description of the Related Art

One of the use cases of a multi-tenancy device is where the solid-state drive (SSD) is shared across multiple tenants (i.e. virtual memories (VMs)) without any hypervisor layer between the SSD and the VM. There are a variety of optimizations around memory usage that will be done when the host operating system (OS) (e.g. Windows Server) implements page movement capabilities. The capabilities require address translation cache (ATS) and Page Request Interface (PRI) functionality in any peripheral component interconnect express (PCIe) device that is directly accessed by guest VMs. Moving memory pages implies the device will receive PCIe addresses that need to be translated.

The primary driver for ATS and PRI in the drive is to get address translation cache (ATC) hits within a single 4 k input/output (IO) command. In some cases, 4 k IO commands (e.g. NVMe Write which means PCIe DMA read) will be broken up into smaller direct memory access (DMA) pieces based on the PCIe max read request size (MRRS). Generally the MRRS is 512-bytes or max 1024-bytes. For example when a device wants to read 4 KB of contiguous data from the host, the device needs to break the request to 8 PCIe transactions while the size of each is 512-bytes. Within a single 4 k IO command, expect to get four times or eight times the reduction in ATS requests due to the drive having the ATS/ATC.

The ATC feature is very expensive since ATC requires a huge memory to be used as the cache buffer (in the order of few megabytes (MBs)) and high-performance lookup operations. ATC significantly increases the area, cost and power consumption of the device. The direct method for supporting ATS/PRI functionality is by implementing a real cache for ATC as defined in PCIe standard. The previous approach is inefficient and leads to expensive solution that consumes more power while having even less performance.

There is a need in the art for improved address translation.

SUMMARY OF THE DISCLOSURE

The present disclosure generally relates to improved address translation. Rather than fetching translated addresses using ATS/ATC, a HIM address translation search engine (HATS) is used through implementing the ATC in a layer above per an NVME command. The HATS is an engine that will monitor pointers with untranslated addresses and will fetch the translated addresses for the pointers. Once the translated addresses are fetched for the pointer, the HATS will overwrite the untranslated address with the translated address. The HATS will then update the status of the pointers. When a translation request fails, the device will use PRI to request the translated address. During a translation request fail the device will drain any incoming requests while skipping the data transfer phase. The device will not block any other requests in a queue. Once that translated address is received through the PRI flow, the status of the pointer will be updated. After PRI completes, the device will return to using the HATS to get all the translated addresses for the pointers with an untranslated address status. After getting the translated addresses, the device shall use the translated addresses to perform DMA operations.

In one embodiment, a data storage device comprises: a memory device; and a controller coupled to the memory device, wherein the controller is configured to: fetch a command from a host device; perform address translation for pointers in the command, wherein the address translation occurs in a nonvolatile memory express (NVMe) layer; fetch physical region page (PRP) lists associated with the pointers, wherein the pointers contain untranslated addresses; perform address translation for the PRP lists; and override the untranslated addresses with translated addresses.

In another embodiment, a data storage device comprises: a memory device; and a controller coupled to the memory device, wherein the controller is configured to: receive an internal data transfer request; fetch pointers for the data transfer request, wherein the pointers contain untranslated addresses; determine whether translated addresses are available in a nonvolatile memory express (NVMe) layer; issue a transfer associated with the internal data transfer request; and override untranslated addresses with translated addresses.

In another embodiment, a data storage device comprises: memory means; and a controller coupled to the memory means, wherein the controller includes a host interface module (HIM) comprising a peripheral component interconnect express (PCIe) layer and a nonvolatile memory express (NVMe) layer, wherein the NVMe layer includes a PCIe address translation cache, wherein the controller is configured to replace untranslated addresses received in pointers for a host command with the fetched translated addresses.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved address translation. Rather than fetching translated addresses using ATS/ATC, a HIM address translation search engine (HATS) is used through implementing the ATC in a layer above per an NVMe command. The HATS is an engine that will monitor pointers with untranslated addresses and will fetch the translated addresses for the pointers. Once the translated addresses are fetched for the pointer, the HATS will overwrite the untranslated address with the translated address. The HATS will then update the status of the pointers. When a translation request fails, the device will use PRI to request the translated address. During a translation request fail the device will drain any incoming requests while skipping the data transfer phase. The device will not block any other requests in a queue. Once that translated address is received through the PRI flow, the status of the pointer will be updated. After PRI completes, the device will return to using the HATS to get all the translated addresses for the pointers with an untranslated address status. After getting the translated addresses, the device shall use the translated addresses to perform DMA operations.

Figure 1:
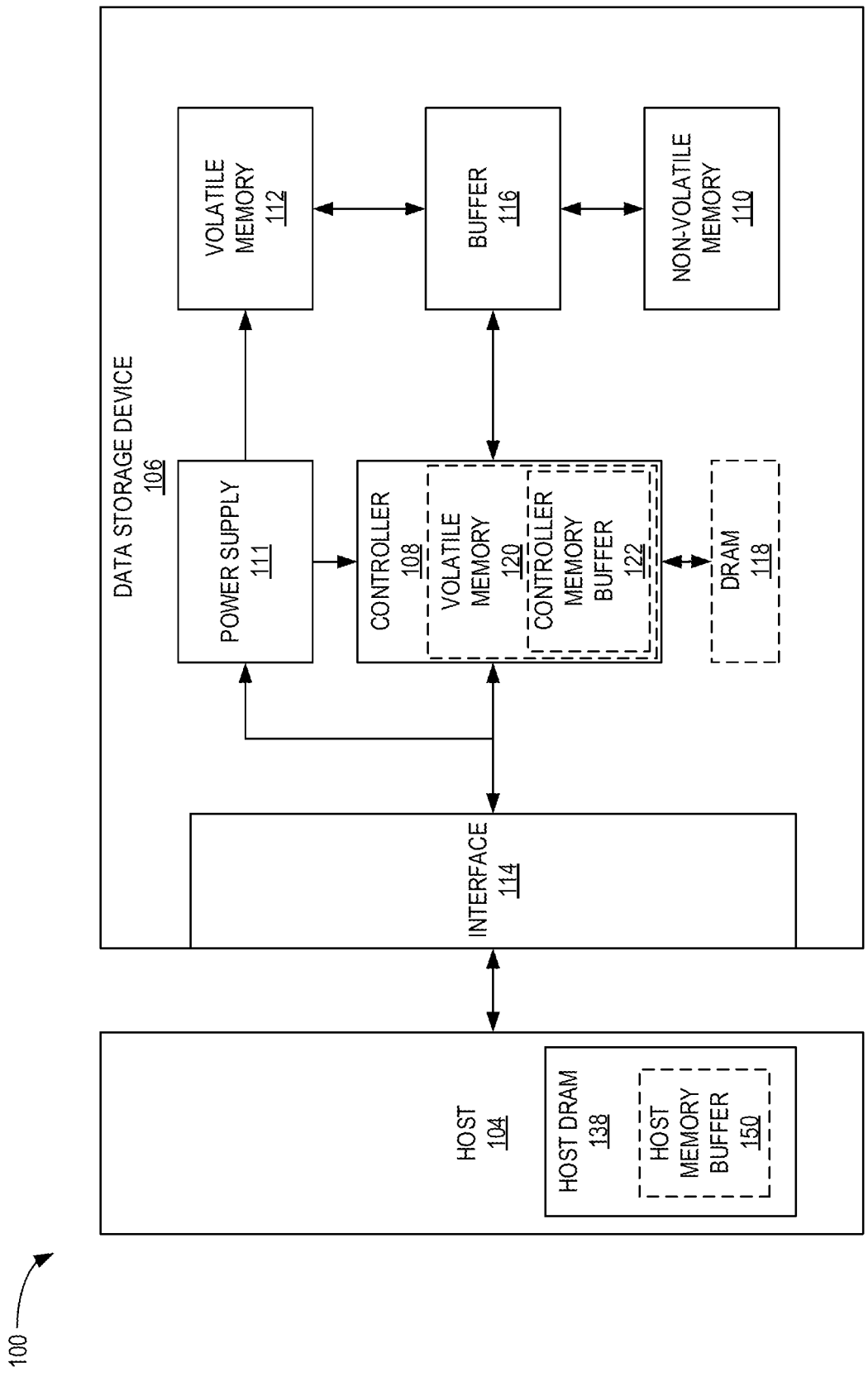
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
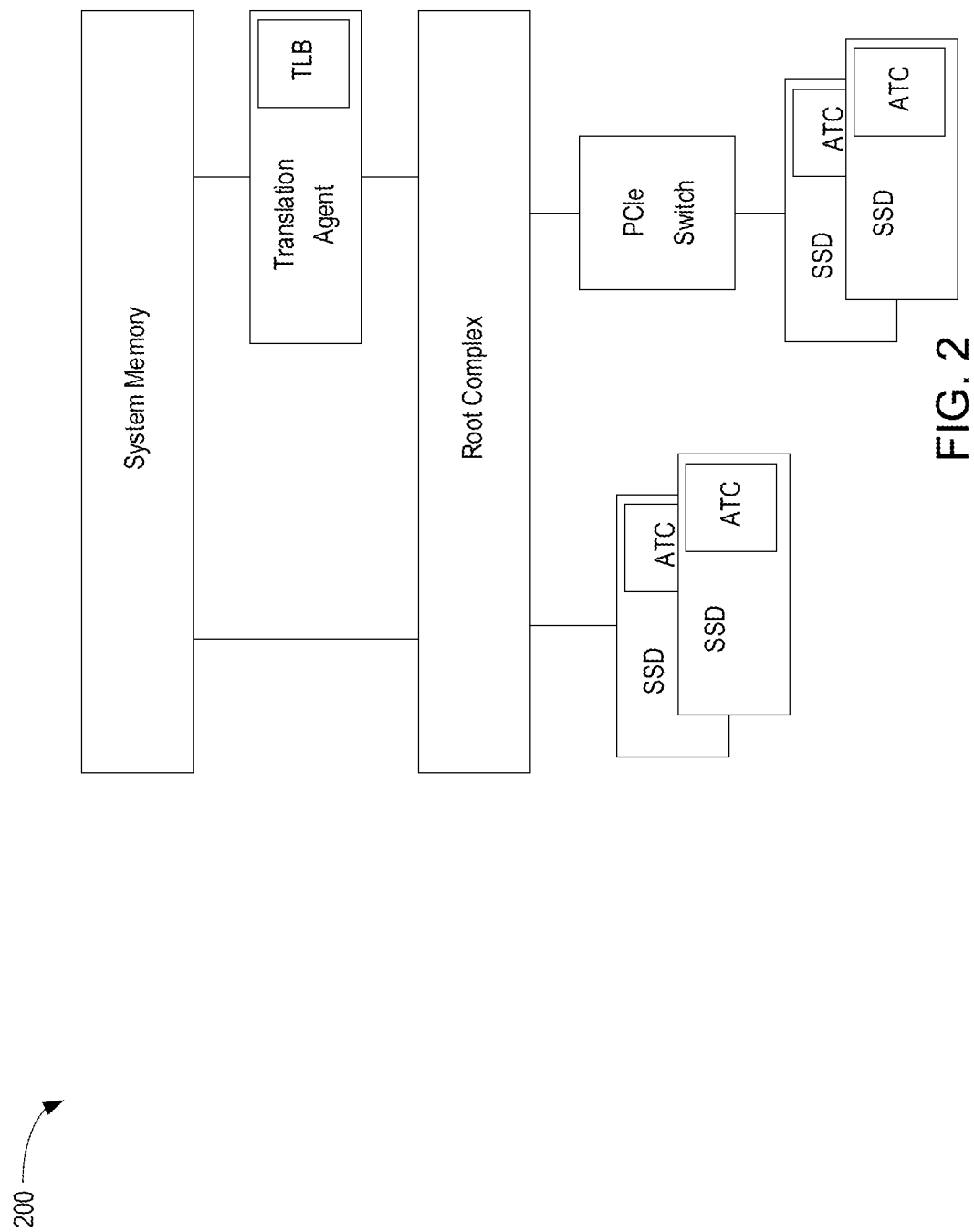
FIG. 2 is a schematic diagram illustrating a multi-tenancy system supporting ATS functionality, according to certain embodiments.

FIG. 2 is a schematic diagram illustrating a multi-tenancy system 200 supporting ATS functionality, according to certain embodiments. A translation agent (TA) services memory translation requests within the TA. The ATC is referred to as a translation look-aside buffer (TLB) in the TA. When the ATS enabled SSD device accesses system memory, the SSD shall cache translated addresses in an internal ATC. The ATC is different from the TLB translation cache used by the host. When the ATS enabled SSD device shall implement and maintain a designated ATC to minimize performance dependencies on the TA and alleviate TA resource pressure.

In one embodiment, all the addresses provided over PCIe are virtual addresses that are untranslated address. Translations must be done before using the virtual addresses. The device receives the commands and then takes the PRP and all addresses provided by the host. The SSD device passes the specific address request to the TA. The TA is a part of the host. The TA will receive the request and the virtual addresses from the SSD device to get translated. As a response, the SSD device will receive back the translated addresses. The device now will be able to issue memory read and memory write requests using the translated addresses. The translated addresses will then be forwarded to the system memory.

In another embodiment, the TA will receive the untranslated addresses. The responsibility of the TA is to convert the addresses or translate the address and provide the translated address back to the device. The TLB is a huge buffer implemented in the TA that holds all the translations that are in the system. If the TLB does a look up and a match of the translated address is not in the TLB, then a new flow (i.e., PRI) will be implemented. The PRI flow is a long flow that will take more time. The PRI flow will have the SSD interact directly with the system memory in order to get the translated addresses. The PRI is a different path to fetch translated addresses when the TLB does not have the translated addresses.

The PCIe standard defines the ATC. The ATC is a cache buffer in the SSD. Using the cache buffer, the SDD is allowed to cache some address translation in the ATC. Whenever an SSD gets a command and then gets the PRP first, the SSD will do some lookup over the internal ATC. Only if the SSD finds a match the SSD will use the translated address stored in the ATC. Otherwise the SSD will interact with the TLB.

Examples of PCIe addresses to be translated include: caching of submission queue (SQ) and completion queue (CQ) address ranges; SQ entry decoding including standard decoding of the data pointer for read or write that submit translation requests immediately, PRPs and SGLs that decode the data pointers and follow linked lists and upper bound of translations per large commands equal a rate match PRI translations with Gen5 bandwidth (BW) maximums, and DIX translation requests for metadata pointers and associated linked lists of addresses.

As discussed herein, implementing implicit cache mechanism for the PCIe address translation in the NVMe layer is disclosed. The NVMe layer is above the PCIe layer. The translated addresses would be stored in the already supported storage for the untranslated addresses. The logic will execute a command (or part of the command) only when the translated addresses are available. In address translation failure scenarios (e.g., PRI), the data transfer requests will be drained and go back to the firmware (FW). The FW will requeue the requests once the address translation issue is resolved.

PCIe address translation services (ATS) in the SSD is where the drive maintains an address translation cache (ATC) of the address translation tables so that the device does not have to look up the address translation from the root complex every time.

Figure 3:
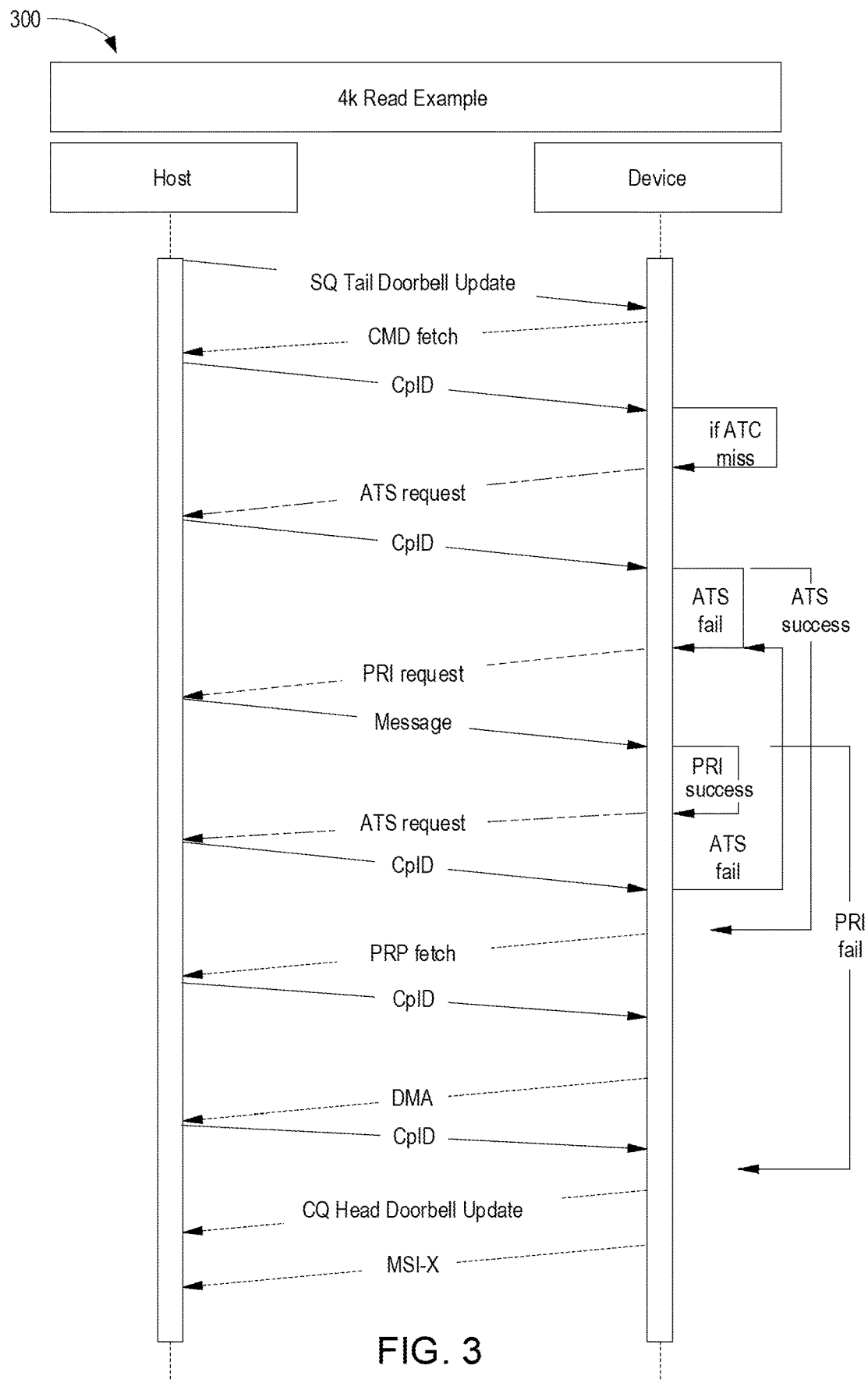
FIG. 3 is a schematic diagram illustrating a 4 KB read command execution supporting ATS, according to certain embodiments.

FIG. 3 is a schematic diagram 300 illustrating a 4 KB read command execution supporting ATS, according to certain embodiments. When ATS and PRI functionality is enabled, ATS and PRI SSD devices will use ATS to translate an address. If the translation request fails, the device will use PRI to request the translated address. In some cases the requested translated address is not a resident in the memory. When a translated address is not in the memory, the PRI request may take a relatively long time to complete. After PRI completes, ATS requests shall be repeated to get the translations of the remaining untranslated addresses. After getting the translated addresses, the device shall use the translated addresses to perform DMA operations.

For example diagram 300, a single read command queued. The host device rings the doorbell so that the data storage device knows to fetch the command. The read command has an untranslated address. If there is an ATC miss, then there will be an ATS request to the host device from the data storage device. If there is an ATS fail, then there will be a PRI request to the host device. If the PRI request is a success, then there will be an ATS request followed by a PRP fetch. Thereafter, there will be a DMA operation completed and the CQ will be updated. If the PRI fails, rather than proceeding with an ATS request, the CQ will be updated. If the initial ATS request is a success, then PRI is not needed, and the PRP fetch would then proceed.

Generally speaking, the command is sent from the host device to the data storage device using ATS and PRI functionality. The command may contain one or more PRPs. The host device sends the command, which queues a doorbell to the data storage device. The host device, sends a notification to the data storage device telling the data storage device there is a pending command waiting for fetching. The data storage device will then go fetch the command using an untranslated address. The host device will then send the completion. By sending the completion the data storage device will receive the command.

If the data storage device implements the ATS functionality, then the data storage device will have lookup capabilities. If there is a miss or fail when fetching a translated address, then the data storage device will send an ATS request. The data storage device then sends the host device an ATS request. The host device will then respond with the translated address.

If the host device tells the data storage device that the ATS has failed, the data storage device will now have to use the PRI flow. The data storage device will send a PRI request to the host device. The host device will respond to the data storage device that the translated address that the data storage device wants is stored in the TLB. The data storage device will now have to access the TLB by sending another ATS request. Following the ATS request, the host device will then send a completion with the translated address.

After having the translated addresses from the command, the data storage device is now allowed to send a PRP fetch request to the host device. The data storage device is now allowed to use the PRP because the data storage device has the translated address for the command that requested the translated address. The data storage device reads the one or more PRPs from the host device since the translated address received has a pointer that points to the remaining PRPs in the host device. The host device will then send a completion message to the data storage device with the translated address of the other remaining PRPs. The data storage device will then use the DMA to transfer the data back to the host device. Finally, an interrupt will be sent to the host device saying that the command has been completed.

Figure 4:
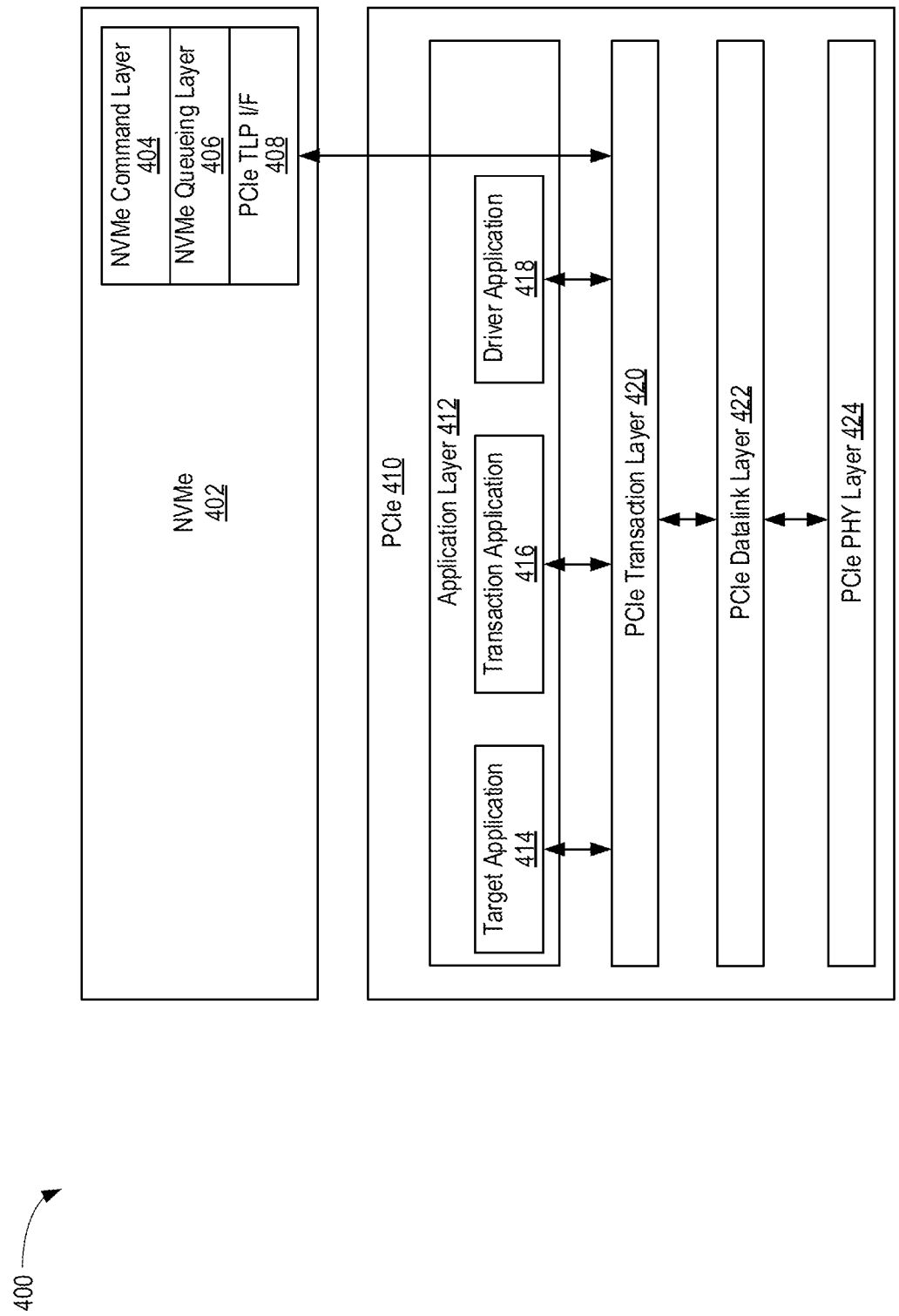
FIG. 4 is a schematic diagram illustrating a structure including an NVMe layer and a PCIe layer, according to certain embodiments.

FIG. 4 is a schematic diagram illustrating a structure 400 including an NVMe layer 402 and a PCIe layer 410, according to certain embodiments. The NVMe layer 402 is a memory transport model used to transfer commands through read and write operations. The PCIe layer 410 enables point to point connections for transmitting and receiving data. An NVMe command (e.g. identify, read, write) is initiated at the host such as host device 104 of FIG. 1 and is converted to an NVMe request. The NVMe request is then sent to a particular submission queue that lives in a host memory. Once the command is inserted into a queue, the host writes to a per-queue doorbell register on the controller. The doorbell wakes up the controller, which then probes the queue for the new request(s). The doorbell reads the queue entry, executes the command (potentially reading data buffers from the host memory). Finally the doorbell appends a completion into a completion queue then notifies the host via an interrupt. The host wakes up, takes the completion off the queue and returns results to the user.

The NVMe layer 402 includes an NVMe command layer 404 configured to send and receive commands. An NVMe queueing layer 406 configured to keep track of commands, and a PCIe transfer layer packet (TLP) interface (I/F) 408.

The PCIe layer 410 includes an application layer 412, a PCIe transaction layer 420, a PCIe datalink layer 422, and a PCIe PHY layer 424. The application layer 412 includes a target application 414, and transaction application 416, and a driver application all in communication with the PCIe transaction layer 420. The PCIe TLP I/F 408 is also in direct communication with the PCIe transaction layer 420. The PCIe TLP I/F 408 creates transaction layer packets which are then sent to the PCIe transaction layer 420 to initiate a write to the appropriate register(s) on the controller such as controller 108 of FIG. 1.

The concept disclosed herein includes untranslated addresses being overwritten by translated addresses. More specifically, the pointer will have the command context (i.e., PRP1, PRP2, or DIX), PRP memory-PRP lists, and SQ/CQ/MSI-X managed by FW. A new status field will be added for each pointer, and the least significant bit (LSB) may be used for most of the status fields. The status field will include an untranslated address initialized by HW, translated addresses set per the disclosure herein when getting and updating the translated address, and PRI flow using drain mode if getting transfer requests. The host interface module (HIM) supports automatic drain per FMU needed for PRI flow.

Figure 5:
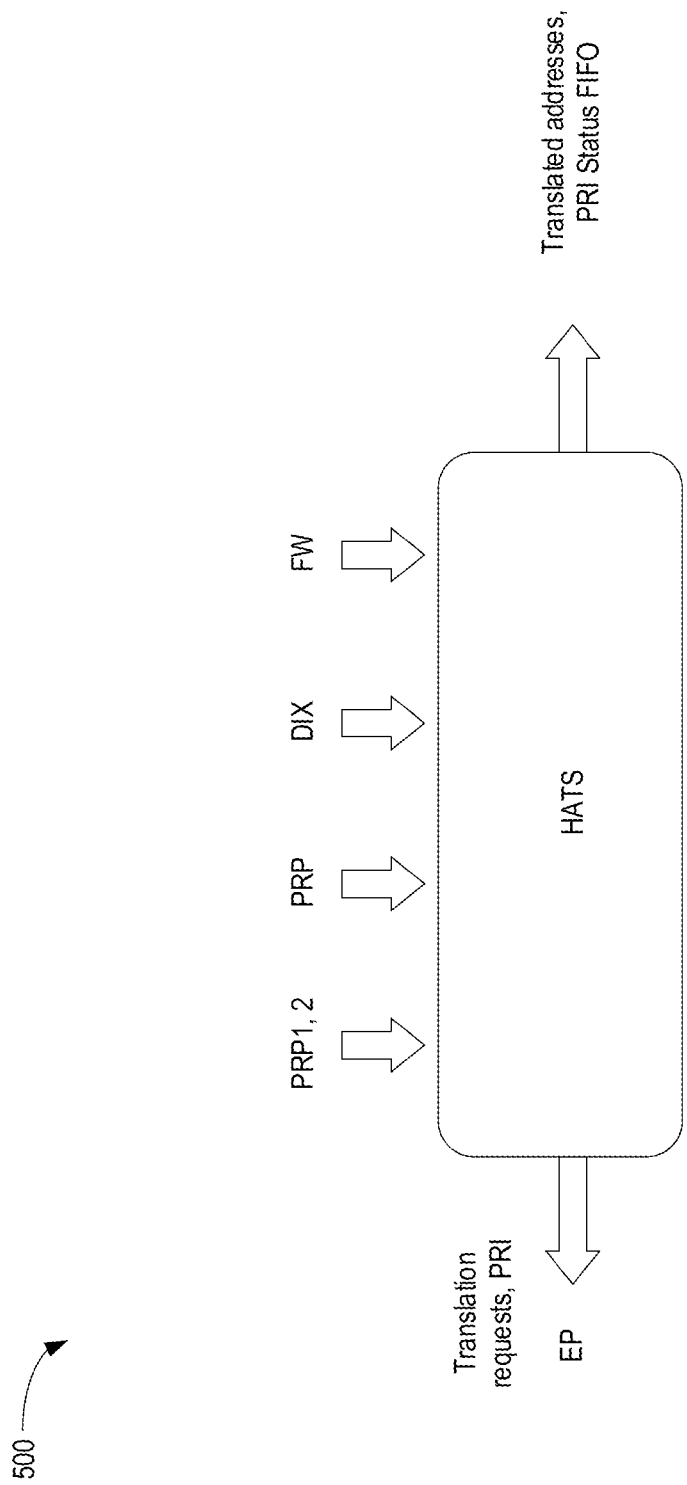
FIG. 5 is a schematic diagram illustrating a HATS, according to certain embodiments.

FIG. 5 is a schematic diagram illustrating a HATS 500, according to certain embodiments. The HATS 500 is a new engine implemented in the device controller for supporting address translation requests. The HATS 500 receives requests to fetch translated addresses from the host whenever an untranslated address is available. The translated address will be fetched by the HATS 500 and then stored in the same location of the untranslated address by overwriting the untranslated address with the translated address.

In operation, the data storage device fetches the host command. The command is an NVMe command because the command is from the NVMe layer such as the NVMe layer 402 of FIG. 4. For example, the command starts with PRP1 and PRP2 which both have untranslated addresses. The data storage device will need to request a translation through an ATS request for both PRP1 and PRP2. When the host sends back the translated addresses, the untranslated addresses will be over written by the translated addresses. The translated addresses will be stored in the same location as the command in PRP1 and PRP2. The command context for other PRPs and PRP lists will also be over written.

Immediately after getting the translation requests, there will be a new engine in the device controller that will be responsible for converting the untranslated addresses to the translated addresses. For each pointer stored internally in the device, the pointer will receive a status field. For example PRP1, PRP2, and all other PRPs will receive a status field. If PRP1 is untranslated then the status will read untranslated address. If PRP2 is translated then the status will read translated address. The data storage device will know when the status of a PRP reads untranslated address. The data storage device is only allowed to use a pointer that has a status of translated address. When the data storage device is not allowed to use a pointer with a status that reads untranslated address, the data storage device will wait for a pointer with a status that reads translated address. The HATS 500 is implemented to fetch the translated addresses when the status of pointers read untranslated address. The HATS 500 will monitor all pointers. When the HATS 500 reads a pointer with a status of untranslated address then the HATS 500 will automatically fetch the translated address for that pointer including other translation services. Once the HATS 500 successfully fetches the translated addresses for the pointers, the HATS 500 will override the value of the pointers with the translated address that was just transferred from the host to the device. The status will then be updated from untranslated address to translated address. The data storage device may now use the pointer that has an updated status field of translated address.

In another embodiment, if the HATS 500 is unsuccessful fetching the translated address, then the pointer status will be updated to PRI flow. The PRI flow is a firmware (FW) flow. In PRI flow, the data storage device will know to drain the descriptor. Drain means that the descriptor is completed, but there is no transfer from the host. The FW will resolve the issue. The FW will get the corrected addresses and requeue the data transfer descriptors to the hardware (HW). The HW will then implement the normal flow.

The HATS 500 will receive requests from several components. For example the HATS 500 will receive requests from PRP1, PRP2, PRP, Data Integrity Extension (DIX), and FW. On one side the HATS 500 will interact with the endpoint (EP), which is responsible for the implementation of the PCIe protocol. Also, the HATS 500 will interact with the host and translated address interface.

When ATC is disabled, for every transaction issued towards the host AT service is needed. Due to the host being needed for every transaction, there will be overhead for the host even though the operation is simple. When ATC is enabled, a huge cache buffer is available that holds the last used untranslated and corresponding translated addresses. Whenever having untranslated addresses, before asking for ATS, the device checks whether the translated address is held in the ATC. Using the ATC is complex but the most efficient operation. In the new approach, when having ATC in the NVMe layer, the translated addresses are stored within NVMe commands. So, a partial cache is implemented (only within a command), but without the complexity of the ATC. The use of ATC in the NVMe allows for a simple operation that is efficient is performance.

Figure 6:
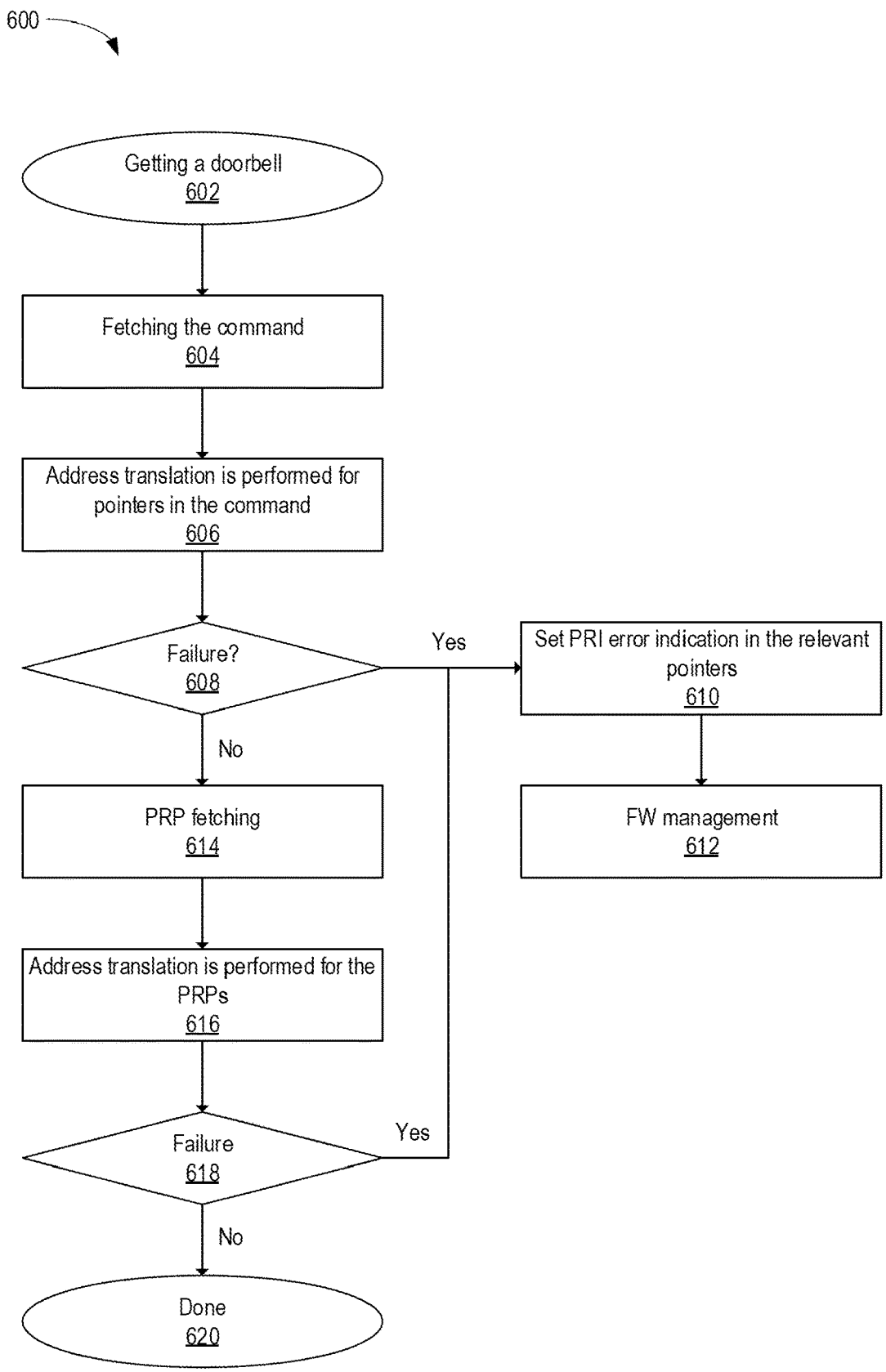
FIG. 6 is a flowchart illustrating a method for control logic of address translation service, according to certain embodiments.

FIG. 6 is a flowchart illustrating a method for control logic of address translation service, according to certain embodiments. The data storage device fetches first the untranslated addresses and stores the untranslated addresses in the internal databases. Then, the address translation is performed while overriding the untranslated addresses with the translated addresses. In any case of address translation failure, the pointer status is updated while notifying the FW.

More specifically, method 600 begins at block 602. At block 602, a data storage device gets a doorbell request from a host. At block 604, the data storage device fetches the command from the host. At block 606, an address translation is performed for the pointers in the command. At block 608, the data storage device determines whether there is a failure in the address translation. If the data storage device determines there is a failure in the address translation, then method 600 will proceed to block 610. At block 610, PRI error indication is set in the relevant pointers. At block 612, the FW management will be interrupted. If the data storage device determines there is no failure in the address translation at block 608, then method 600 will proceed to block 614. At block 614, the data storage device continues PRP fetching. At block 616, address translation is performed for the PRPs that were fetched. At block 618, the data storage device determines whether there is a failure in the address translation. If the data storage device determines there is a failure in the address translation, then method 600 will return to block 610. If the data storage device determines there is no failure in the address translation at block 618, then method 600 will proceed to block 620 where the operation is done.

Figure 7:
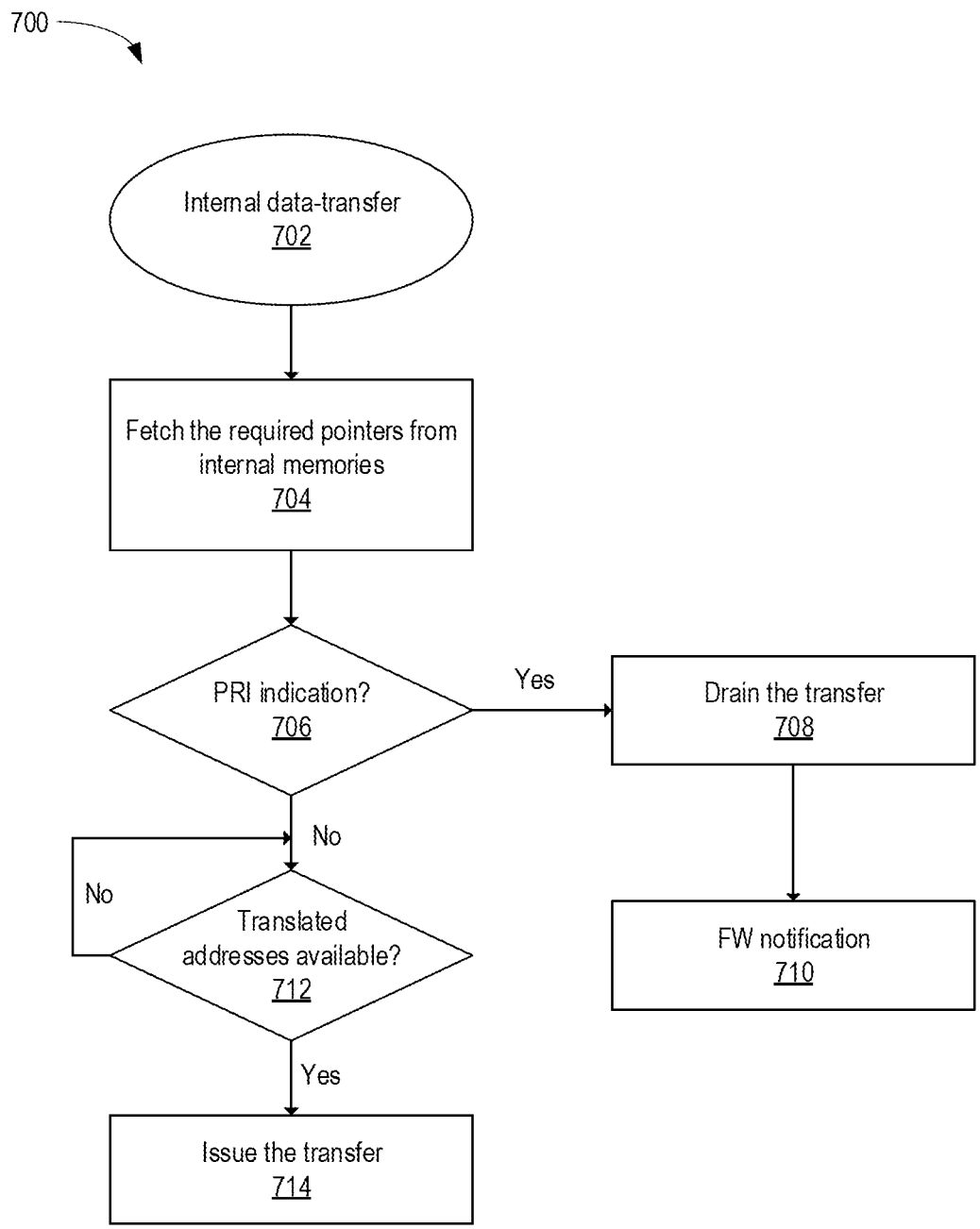
FIG. 7 is a flowchart illustrating a method for data transfer logic supporting address translation service, according to certain embodiments.

FIG. 7 is a flowchart illustrating a method 700 for data transfer logic supporting address translation service, according to certain embodiments. When the status field of the relevant pointer indicates PRI flow, the request is drained. Otherwise, the request is executed but only after having the translated addresses.

More specifically, method 700 begins at block 702. At block 702, there is an internal data-transfer request. At block 704, the required pointers are fetched from the internal memories. At block 706, the data storage device determines whether there is a PRI indication. If the data storage device determines there is a PRI indication, then method 700 will proceed to block 708. At block 708, the transfer will be drained. Draining the transfer includes draining the descriptor as well. By draining the descriptor, no transfer will be implemented to the host. At block 710, the data storage device notifies the FW that the descriptor was completed but failed. If the data storage device determines there is no PRI indication at block 706, then method 700 will proceed to block 712. At block 712, the data storage device determines whether there are any translated addresses available. If the data storage device determines there are no translated addresses available, then method 700 will return to block 712 until there are translated addresses available. If the data storage device determines there are translated addresses available at block 712, then method 700 will proceed to block 714. At block 714, the transfer is issued.

The advantage of the new approach include no extra area, complex logic, cost, or power is needed. The new approach will work for new generations of devices, and there is no performance degradation.

In one embodiment, a data storage device comprises: a memory device; and a controller coupled to the memory device, wherein the controller is configured to: fetch a command from a host device; perform address translation for pointers in the command, wherein the address translation occurs in a nonvolatile memory express (NVMe) layer; fetch physical region page (PRP) lists associated with the pointers, wherein the pointers contain untranslated address; perform address translation for the PRP lists; and override the untranslated addresses with translated addresses. The controller is configured to determine whether the address translation for the pointers fails or succeeds. The determining occurs prior to the fetching. The controller is configured to initiate page request interface (PRI) upon determining the address translation of the pointers failed. The controller is configured to determine whether the address translation for the PRP lists fails or succeeds. The controller is configured to initiate page request interface (PRI) upon determining the address translation for the PRP lists failed. The controller is further configured to: receive an internal data transfer request; fetch pointers for the data transfer request; determine whether translated addresses are available in the NVMe layer; and issue a transfer associated with the internal data transfer request. The pointer contains a status field. The status field is a least significant bit (LSB) of the pointer. The status field is updated according to the translated addresses in the pointer. The translated addresses are retrieved from cache in the NVMe layer.

In another embodiment, a data storage device comprises: a memory device; and a controller coupled to the memory device, wherein the controller is configured to: receive an internal data transfer request; fetch pointers for the data transfer request, wherein the pointers contain untranslated addresses; determine whether translated addresses are available in a nonvolatile memory express (NVMe) layer; issue a transfer associated with the internal data transfer request; and override untranslated addresses with translated addresses. The controller is configured to request translated addresses from a host device upon determining translated address are not available. The controller is configured to request page request interface (PRI) from the host device upon receiving a notification from the host device that translated addresses are not available.

In another embodiment, a data storage device comprises: memory means; and a controller coupled to the memory means, wherein the controller includes a host interface module (HIM) comprising a peripheral component interconnect express (PCIe) layer and a nonvolatile memory express (NVMe) layer, wherein the NVMe layer includes a PCIe address translation cache, wherein the controller is configured to replace untranslated addresses received in pointers for a host command with the fetched translated addresses. The PCIe address translation cache contains addresses associated with physical region page (PRP) lists retrieved from a host device. The PCIe address translation cache is disposed in a HIM address translation service (HATS) engine disposed in the HIM. The HATS engine is configured to fetch translated addresses from a host. The controller is configured to update a status field in the pointer according to the translated addresses. The PCIe layer does not include an address translation cache (ATC).

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      fetch a command from a host device;
      perform address translation for pointers in the command, wherein the address translation occurs in a nonvolatile memory express (NVMe) layer;
      fetch physical region page (PRP) lists associated with the pointers, wherein the pointers contain untranslated addresses;
      perform address translation for the PRP lists; and
      override the untranslated addresses with translated addresses.

2. The data storage device of claim 1, wherein the controller is configured to determine whether the address translation for the pointers fails or succeeds.

3. The data storage device of claim 2, wherein the determining occurs prior to the fetching.

4. The data storage device of claim 2, wherein the controller is configured to initiate page request interface (PRI) upon determining the address translation of the pointers failed.

5. The data storage device of claim 1, wherein the controller is configured to determine whether the address translation for the PRP lists fails or succeeds.

6. The data storage device of claim 5, wherein the controller is configured to initiate page request interface (PRI) upon determining the address translation for the PRP lists failed.

7. The data storage device of claim 1, wherein the controller is further configured to:
receive an internal data transfer request;
fetch pointers for the data transfer request;
determine whether translated addresses are available in the NVMe layer; and
issue a transfer associated with the internal data transfer request.

8. The data storage device of claim 1, wherein the pointer contains a status field.

9. The data storage device of claim 8, wherein the status field is a least significant bit (LSB) of the pointer.

10. The data storage device of claim 9, wherein the status field is updated according to the translated addresses in the pointers.

11. The data storage device of claim 10, wherein the translated address is retrieved from cache in the NVMe layer.

12. A data storage device, comprising:
a memory device; and
a controller coupled to the memory device, wherein the controller comprises a host interface module (HIM) having a HIM address translation service (HATS) engine disposed in the HIM and a peripheral component interconnect (PCI) express (PCIe) address translation cache disposed in the HATS engine, wherein the controller is configured to:
receive an internal data transfer request;
fetch pointers for the data transfer request, wherein the pointers contain untranslated addresses;
determine whether translated addresses are available in a nonvolatile memory express (NVMe) layer;
issue a transfer associated with the internal data transfer request; and
override untranslated addresses of physical region page (PRP) pointers with translated addresses from the NVMe layer.

13. The data storage device of claim 12, wherein the controller is configured to request translated addresses from a host device upon determining translated address are not available.

14. The data storage device of claim 13, wherein the controller is configured to request page request interface (PRI) from the host device upon receiving a notification from the host device that translated addresses are not available.

15. A data storage device, comprising:
memory means; and
a controller coupled to the memory means, wherein the controller includes a host interface module (HIM) comprising a peripheral component interconnect express (PCIe) layer and a nonvolatile memory express (NVMe) layer, wherein the NVMe layer includes a PCIe address translation cache, wherein the controller is configured to replace untranslated addresses received in pointers for a host command with fetched translated addresses, wherein the PCIe address translation cache is disposed in a HIM address translation service (HATS) engine disposed in the HIM.

16. The data storage device of claim 15, wherein the PCIe address translation cache contains addresses associated with physical region page (PRP) lists retrieved from a host device.

17. The data storage device of claim 15, wherein the HATS engine is configured to fetch translated addresses from a host.

18. The data storage device of claim 17, wherein the controller is configured to update a status field in the pointer according to the translated addresses.

19. The data storage device of claim 15, wherein the PCIe layer does not include an address translation cache (ATC).

20. The data storage device of claim 15, wherein the NVMe layer includes a PCIe transfer layer packet (TLP) interface.

* * * * *